Sept. 15, 1942.        R. WESTON        2,295,922
VEGETABLE JUICER
Filed July 15, 1938        2 Sheets-Sheet 1

Inventor
Roy Weston
By Charles L. Reynolds
Attorney

Sept. 15, 1942.  R. WESTON  2,295,922
VEGETABLE JUICER
Filed July 15, 1938   2 Sheets—Sheet 2

Inventor
Roy Weston
By Charles L. Reynolds
Attorney

Patented Sept. 15, 1942

2,295,922

UNITED STATES PATENT OFFICE 2,295,922

VEGETABLE JUICER

Roy Weston, Toppenish, Wash., assignor of one-half to B. R. Sturm, Toppenish, Wash.

Application July 15, 1938, Serial No. 219,388

13 Claims. (Cl. 146—3)

My invention relates to a juicer, which may be termed a vegetable juicer since it is intended to extract juice from various sorts of vegetables, such as spinach and carrots, but in the larger sense it is intended to extract juice from fruits as well, such as apples or berries. Therefore, while it is termed a vegetable juicer, it is to be understood that the term "vegetable" is intended to include fruits and the like, and indeed whatever product may be pulped and juiced by such a machine.

Such juices are highly regarded by many, but can not be or should not be prepared in advance. When freshly prepared such juices possess certain values and constituents which are evanescent, and to obtain their full benefit it is considered necessary to juice the vegetable just prior to consuming the juice. It is therefore necessary, and it is an object of this invention, to provide such a juicer which may be used by the individual, or by the individual household, to produce juices from all sorts of vegetables as and when required.

It is also considered desirable by some, or under some circumstances, to mix the juices of two different vegetables, whether to modify the taste of one or both or to add certain qualities not possessed by one alone. Again the mixture can be best accomplished if the two fruits are juiced simultaneously, and the juices are caused to mingle immediately they are produced. It is therefore a further object of this invention to provide a vegetable juicer by the use of which two or more such fruits may be juiced simultaneously and the juices immediately mixed. Still a further object is to provide a machine so constructed that it will facilitate the mixing and act as a stirrer, to some extent.

While many such juices are prepared by pulping and extracting from the pulp the juice of vegetables such as carrots, apples and the like, there are occasions when it is desired, or some persons may desire to be able upon occasion, to juice citrus fruits, and by the same general device. It is therefore an object of the present invention to provide a juicer which is suitable interchangeably to juice such vegetables as carrots or apples or spinach, on the one hand, and citrus fruits on the other hand, and a device which is so interchangeable quickly and with a minimum of difficulty.

It is a further object to provide such a machine which employs a filter liner or bag, and to construct that filter bag in such a way that it readily cooperates with the remainder of the device, yet is readily removable when it is desired to clean it, but which will be maintained properly in place within a rotary centrifugal basket, and which will be directed inwardly at the top and bottom to avoid the splashing of juice or pulp from the basket, yet which is readily disengageable for the passage of parts contained inside the filter bag but which are larger than the openings in the filter bag.

It is a further object to provide such a juicer in which the pulping and juicing is accomplished in one operation, and entirely within the centrifugal basket and filter bag, to the end that the pulp is thrown centrifugally in a finely divided state against the inside of the filter bag and basket for immediate straining.

Still a further object is to provide means to regulate the degree of pulping by varying readily the spacing between two cooperating disks, one of which is a pulping disk.

Generally speaking, then, it is an object of the invention to provide an arrangement of the various parts of such a juicer, which will be effective to the end in view, simple, convenient, and comparatively inexpensive, and which will be rugged in use.

With these and other objects in mind, as will appear hereafter, my invention comprises the novel parts, and the novel combination and arrangement thereof, as shown in the accompanying drawings, described in this specification, and as will be more particularly defined by the claims which terminate the same.

In the accompanying drawings I have shown my invention embodied in a form which is at present preferred by me.

Figure 1:
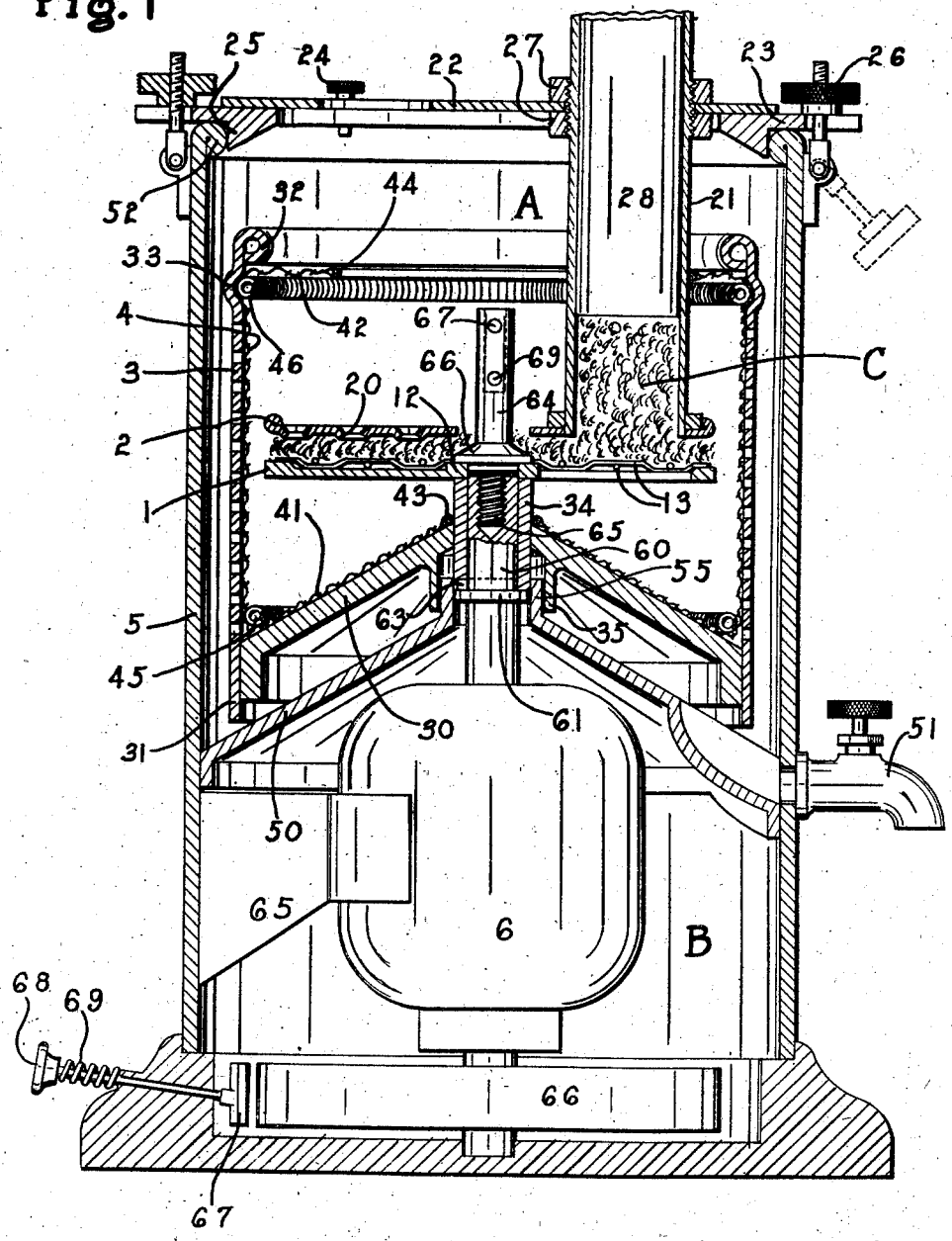
Figure 1 is an axial section through the juicer, as a whole, showing parts arranged for juicing spinach, for instance, or other vegetable.

A container 5 is divided into an upper and a lower chamber by a conical bottom 50. In the lower chamber B, which is shown as closed, but which may be more or less open, is supported an electric motor 6. The upper chamber A, which is open at its top, receives a rotary perforate centrifugal basket 3 and two cooperating horizontal and parallel disks 1 and 2. The disk 1, which is the lower one, rotates, as does the basket 3, being mounted upon the vertical, axially disposed motor shaft 60. The disk 2 is stationary. These disks are so formed and disposed that a vegetable fed to the comparatively small space between these disks is held by the stationary disk 2 and torn to small bits by the rapidly rotating disk 1, or vice versa, and thus it is very rapidly chewed to a pulp, and is thrown outwardly by the rotating disk 1 against the vertical wall of the strainer basket 3. The strainer basket is provided with a filter liner or bag 4, upstanding against its inside wall, and the pulp is deposited upon this filter bag, which rotates with the basket 3. The particles of pulp are intercepted and strained through this filter bag and through the holes in the wall of the basket 3, being received in the container 5 and finding its way to the bottom 50. There it collects and may be drawn off as required through the faucet 51.

In its general features such juicers are known, but in various details of construction and relative arrangement, which will now be pointed out, the present juicer differs from other juicers.

The container 5 is open at its top, though its open top may be slightly restricted by an inwardly turned bead 52. The basket 3, provided with a conical bottom 30 and a depending flange 31, is likewise freely open at its top, except as the top is silghtly restricted by an inturned bead 32, and the basket may also have a groove 33 just underneath its upper rim. Its outside diameter, however, is sufficiently less than the inside diameter of the bead 52 that the basket may be lifted bodily through the open top of the container 5. When placed within the container a sleeve 34, constituting an integral part of the basket, surrounds the shaft 60 and seats upon the flange 61, and the sleeve 34 is notched at its bottom to fit a cross pin 63 in the shaft, whereby the basket is rotated with the shaft 60. The basket has appreciable weight, and this in itself may be sufficient to hold the notch engaged with the cross pin, though the basket is preferably held down positively by other means which will be described later.

It is to be noted that the depending flange 31 rides close to the lowest point of the bottom of the container, and as it rotates it acts to stir juice which runs to and is collected in the bottom of the container, and if two or more vegetables are being juiced at one time, this flange 31 acts to stir and mix these two juices until withdrawn. In any event it prevents settling of any residue in the juice.

The filter liner 4 is preferably made of muslin or like material, and its main body is cylindrical and of a size to fit closely within the inner wall of the strainer basket 3. However, at its bottom it may be and preferably is provided with an inwardly directed flange 41 of similar material, and at its top it is preferably provided with an inwardly directed flange 42 of like material. The bottom flange 41 has a central opening just large enough to permit the sleeve 34 to pass through it. The central opening of the top flange 42 is somewhat larger, and each of these flanges, within its margin, receives an inwardly contractile annulus such as the rubber bands 43 and 44. These stretch their respective flanges, causing the bottom flange 41 to hug the conical bottom 30 of the basket, and to fit as closely as may be to the sleeve 34. The rubber band 44 pulls the flange 42 inwardly, and each opening is thus contracted to a diameter less than that of the disks 1 and 2, which lie between the flanges and within the basket. To hold the filter bag in operative position against the wall of the basket, when the basket is stationary, and to afford resistance against which the contractile bands 43 and 44 may pull, I provide outwardly expansive bands, such as the loops of coil spring 45 and 46. The spring loop 46 may lie in the groove 33. Here it affords resistance to the contractile band 44, effectively stretching the upper flange 42 of the filter bag. This construction holds the filter bag 4 in place at all times. When the basket is stationary the filter bag is held in place by the outward expansion and frictional effect created by the spring loops 45 and 46, particularly the latter. When the basket is rotating, the appreciable mass of these spring loops further assists in holding the filter bag in place. Obviously, the material of which these loops and bands are formed must be such as will be unaffected by, and as will not in turn affect, the juice.

The disk 1 is a rotative disk, and is secured upon the upper end of the shaft 60 well above the conical bottom 30, for easy removal. This may be accomplished in various ways. As shown, the disk 1 is formed with an outer rim 10 and spider arms 11 extending outwardly from a flat hub 12 (see Figure 3), and the face of the disk is formed of interwoven radial and circumferential wires 13. A perforated disk might be substituted for the construction shown, especially if finer pulping is desired, and such a disk is shown at 19 in Figure 2. However, the principal consideration is that the disk 1 and its cooperating stationary disk 2 be so arranged and formed that each engages the vegetable which is fed into the small space between them, so that the vegetable is held by one and shredded by the other. To this end the stationary disk 2 should be substantially equal in size to the disk 1 and is provided with punched apertures 20, with upstanding margins, as in any greater disk, and this serves to hold the vegetable stationary while it is shredded by the rapidly rotating disk 1. The disk 19 is similarly but oppositely punched and formed.

To effect rotation of the disk 1 its hub 12 rests upon the upper end of the sleeve 34, and a shaft extension 64, having a threaded stem 65 and flange 66, is threaded into the axially bored and threaded upper end of the shaft 60, clamping the hub 12 between the flange 66 and the end of the sleeve 34. At the same time this holds the notch in the sleeve 34 in firm engagement with the cross pin 63, and the lower end of the sleeve 34 into firm engagement with the flange 61. To afford purchase to the extension 64 it may be provided with a cross hold 67 wherein a cross pin may be engaged to tighten the threaded end 65.

The stationary disk 2 is inserted through the open top of the container 5, and through the open top of the basket 3, as is also the rotary disk 1. These two disks, therefore, must be of such diameter that they will pass through the open tops of the container and basket, respectively. To support the disk 2, and to hold it stationary, any convenient means may be provided, carried by the top of the container 5. Preferably the stationary disk 2 is supported by a chute or chutes 21 which extend down through the open top of the container and basket, and which is supported in its upper end in a cover plate 22, resting upon the top of the container 5 through an intermediary flange 23. The cover 22 is secured to the flange 23 by suitable easily removable means such as the screws 24, and the flange 23 in turn is provided with lugs 25 whereby it is centered in the open top of the container, and it is secured in place by a pivoted screw and nut, indicated at 26, and received in radial notches in the outer margin of the flange. It is preferred that the inside diameter of the flange 23 be large enough to permit passage therethrough of the disks 1 and 2, but not large enough that the basket 3 may pass through.

It is desirable to provide means to adjust the spacing between the disks 1 and 2. Since the height of the disk 1 is fixed, this may readily be accomplished by adjusting the height of the disk 2. The chute 21 is supported from the cover plate 22 by means of the cooperating clamping nuts 27 threaded upon the exterior of the chute 21 at opposite sides of the cover plate. The lower end of the chute is preferably secured permanently to the disk 2. By adjusting the chute vertically, through adjustment of the nuts 27, the spacing of the disk 2, relative to the disk 1, is adjusted.

Figure 3:
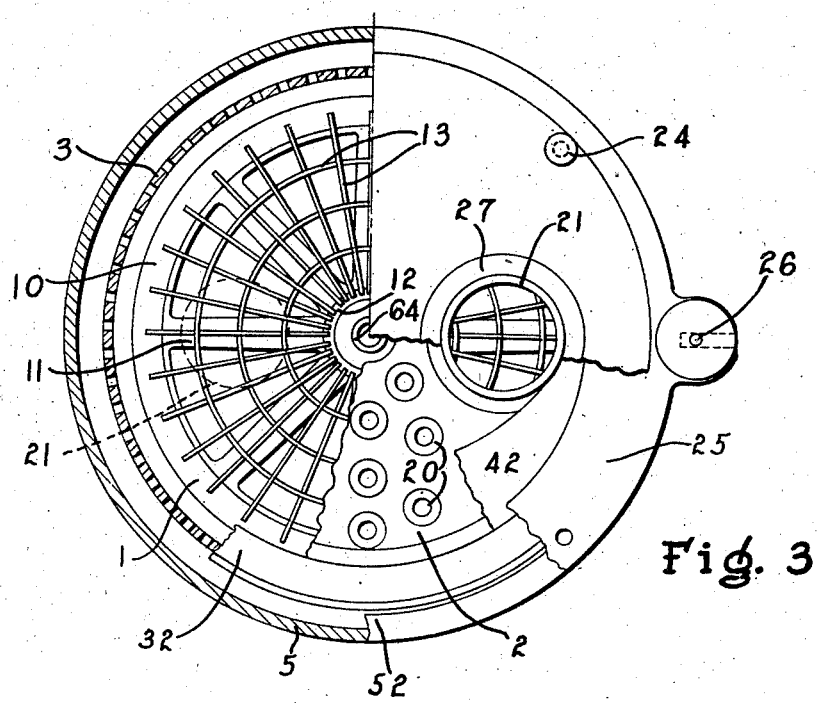
Figure 3 is in part a plan view, and in part an elevation of the juicer, elements being successively broken back to illustrate hidden parts.

Preferably two such chutes 21 are employed, each offset from the axis of the container, as is indicated in Figure 3. This more firmly supports the disk 2 and prevents its rotation without undue strain on the supporting means. In addition it permits two different vegetables to be fed to the pulping disk simultaneously. The feeding of the vegetables is accomplished preferably by positive means, such as the pushers or plungers 28. Of course, if it is not desired to feed two different vegetables, double quantities of the same vegetable may be fed at one time, a part through one chute and a part through another. Also it will be understood that if for any reason it is desired to feed three or more different kinds of vegetables at one time, three or more such chutes may be provided.

Whenever it is desired to clean the disk 2 or the disk 1, or both, they may be removed by removing the cover 22, without removing the flange 23. The basket 3 can then be removed by removing the flange 25. All parts are thus conveniently separable and accessible for cleaning.

Figure 2:
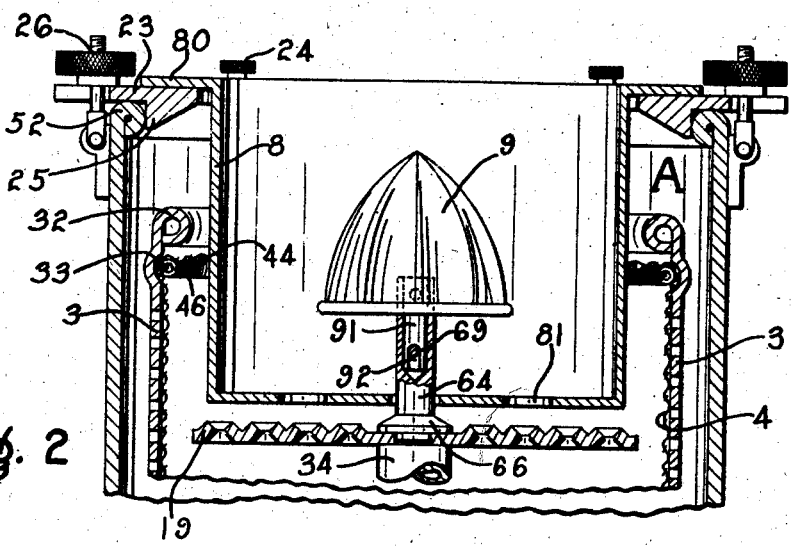
Figure 2 is an axial section through the upper part of the juicer, showing parts arranged for juicing citrus fruit.

With the stationary disk 2 and associated parts removed, whether the rotary disk 1 is removed or not, the flange 25 will serve as a support for a cup-like element 8, which is shown in Figure 2. The cup 8, provided with the flange 80 to seat upon the flange 23, is provided with a bottom having the large apertures 81. It is employed when the juicer is to be used for juicing citrus fruits, largely to prevent any possibility that the hand of the user may slip and engage the rapidly rotating pulping disk 19 (though the latter may be removed, if desired), and to intercept and guide the juice downwardly to the proper level relative to and within the basket before releasing the juice to the basket and filter bag. A special citrus juicer head 9 is employed, this having a stem 91 slotted, as indicated at 92, to fit over a cross pin 69 in the end of the shaft extension 64, the latter being axially bored for the reception of the stem 91.

To employ the citrus juicer it is only necessary to remove the stationary disk 2 and its support, to slip into place in its stead the cup 8, holding it by the same screws 24, and then to slip the citrus juicer head into place. The latter then rotates with the shaft 60, and a half of a citrus fruit held upon the juicer head 9, properly shaped to fit the particular citrus fruit, is juiced in the usual way, and the pulp, falling through the perforations 80, is thrown centrifugally outwardly by the rapidly rotating disk 19 (or by the bottom of the basket, if no rotating disk is in place) against the inside of the strainer basket 3 and the filter bag 4. The bottom of the cup 8 protects the user against accidental contact with the disk 19, as previously noted.

It will be observed that the bottom 50 is flanged upwardly, as indicated at 55, Figure 1, and that the conical bottom 30 of the basket is provided with a depending sleeve 35, which fits closely about the flange or sleeve 55. This is intended as a trap to prevent access of juice to the motor through the hole through which the shaft 60 extends, though centrifugal force will largely prevent this in any case.

The motor is suitably supported within the bottom of the casing or container, as for instance by brackets 65, and preferably upon the lower end of its shaft there is fitted a drum or wheel 66, which may act somewhat in the nature of a flywheel, although the bottom 30 of the strainer basket has a similar effect. The element 66, however, may balance the rotating weights above, and prevent undue wear on the motor and its bearings. It has a further purpose in that a brake shoe 67 is provided, operable by a button 68 in opposition to a spring 69, whereby the motor may be brought more quickly to a stop, when that is desired.

It is believed that the operation and the advantages of the machine will now be clear. The vegetables (as spinach, indicated at C) are fed to the space between the disks 1 and 2 through the chute or chutes 21, and immediately they reach this space they are acted upon by the disk 1, rotating at high speeds, and by the disk 2 which is stationary, and the vegetable is quickly torn to small bits, juice is forced through the two perforated discs, and the pulp is thrown by the centrifugal action of the disk 1 outwardly against the inner wall of the filter bag and strainer basket. The juice residue is extracted from the pulp by the centrifugal action of the rapidly rotating basket, and runs down to the bottom of the chamber A, where it may be drawn off from time to time by operation of the faucet 51. When the operation is completed, the motor switch (not shown) is turned off, the motor is stopped by the brake shoe 67, and for cleaning the machine the cover 22 is removed, carrying with it the chutes and the stationary disk 2. Ordinarily the band 44 expands to permit passage of the disk 2 through its central opening. The disk 1 will then be removed normally, for cleaning, by removing the shaft extension 64. The entire basket 3 may then be lifted out, having removed the flange 25, and the filter bag lifted from within it. If the citrus juicer is desired, first the basket and filter bag, and then the shaft extension 64 is replaced, and this may be replaced with or without the rotary disk 1 or 19. The cup 8 is now put in place, and then the citrus juicer head 9. The band 44, in this use of the machine, is expanded by the wall of the cup 8, as is seen in Figure 2.

What I claim as my invention is:

1. A vegetable juicer comprising a container open at its top, a centrifugal strainer basket rotatively mounted within the container, a pulping disk disposed within and rotative with the basket, a citrus juicer head removably securable within and rotatable with the basket, and a stationary cup depending within the container and basket, surrounding the citrus juicer head, and having a perforate bottom disposed between the citrus juicer head and the rotary disk.

2. A vegetable juicer comprising an upstanding container, open at its top, a rotary shaft threaded at its upper end, and axially upstanding from the bottom of the container, a strainer basket having an axial sleeve engaged about said shaft to rotate therewith, and removable through the open top of the container, a shaft extension threaded upon the upper end of the shaft and securing the basket, a pulping disk carried upon and rotatable with the shaft, and held by said shaft extension, disposed in a substantially horizontal plane within the basket, a citrus juicer head removably securable upon and rotatable with the shaft extension, within the basket, and a stationary cup depending within the container and basket, surrounding the citrus juicer head, and having a perforate bottom disposed between the citrus juicer head and the rotary pulping disk.

3. A vegetable juicer comprising an upstanding container open at its top, an open top centrifugal strainer basket disposed within the container, a rotary shaft extending upward through the bottom of the container and basket, and secured to rotate the latter, a rotary pulping disk secured upon said shaft, within the basket, a stationary disk within the basket and slightly spaced from the rotary disk, means depending through the open top of the container and basket to support the stationary disk, a filter bag fitting the bottom and sides of the basket, and extending inwardly at its top, and a spring coil loop expansible radially, disposed within the basket and bag, to maintain the bag in position, by such expansion, and by centrifugal effect.

4. A vegetable juicer comprising an upstanding container open at its top, an open top centrifugal strainer basket disposed within the container, a rotary shaft extending upward through the bottom of the container and basket, and secured to rotate the latter, a rotary pulping disk secured upon said shaft, within the basket, a stationary disk within the basket and slightly spaced from the rotary disk, means depending through the open top of the container and basket to support the stationary disk, a filter bag fitting the sides and bottom of the basket, apertured in its bottom to pass the shaft, and extending inwardly at the top, surrounding the disk-supporting means, inwardly contractile means to draw the top and bottom openings of the bag inward to a diameter less than that of the disks, and readily releasable means to support the bag in place within the basket, prior to development of sufficient centrifugal force for the purpose.

5. In combination with the centrifugal basket of a vegetable juicer, a filter bag comprising a cylindrical body of muslin or the like, of a size to fit within the basket, a top flange and a bottom flange, each of like material and each having a central opening, a contractile rubber band in the margin of each central opening, to contract its flange, and an outwardly expansive ring fitting within the bag, at the base of each flange, and pressing outwardly against the wall of the basket, the flanges being held stretched between the inwardly and outwardly expansive elements.

6. A vegetable juicer, comprising a stationary container, a strainer basket supported therein for rotation about an upright axis, a pair of cooperating, superposed, closely spaced pulping members within said basket, the lower member being supported for rotation therewith and the upper member being stationary, a vegetable feeding tube carrying and extending upward from said upper pulping member, a cover for said container having an aperture therein for reception of said tube, and collars, one bearing against the top and another against the bottom of said cover, encircling and secured to said tube, and adjustable lengthwise thereof to clamp said tube to said cover with said upper pulping member held spaced above said lower pulping member different distances.

7. A vegetable juicer, comprising a stationary container, a centrifugal strainer cage supported therein for rotation about an upright axis, rotatable pulping means supported within said cage for rotation therewith, a motor for rotating said cage and pulping means, a heavy cage bottom member secured to the lower edge of said strainer cage and constituting a flywheel for said motor, and a second flywheel connected to the motor and disposed at the side thereof remote from said cage, pulping means and cage bottom member, and torsionally balancing the same.

8. A vegetable juicer, comprising a stationary container having a substantially conical bottom, a motor housed closely beneath such bottom raised centrally and inclined downwardly and outwardly therefrom, a motor shaft extending centrally upward through such bottom, a strainer basket disposed within said container and connected to said shaft for rotation thereby, said basket having a substantially conical bottom raised centrally and inclined downwardly and outwardly conforming to the bottom of said container, a pulping disk also connected to said shaft for rotation therewith, and disposed within said basket a substantial distance above the bottom thereof, and a stationary plate substantially parallel to and cooperating with said pulping disk and supported thereabove from said container.

9. A vegetable juicer, comprising a stationary container having a centrally apertured bottom and a flange upstanding therefrom, a motor disposed below the container bottom and having a shaft extending upward therefrom through the aperture in said container bottom, a strainer basket disposed within said container and connected to said shaft for rotation thereby, the bottom of said basket being disposed centrally closely adjacent the container bottom and having a flange closely encircling said container bottom flange and extending downward a substantial distance below the upper edge thereof, and pulping means disposed within said basket.

10. A vegetable juicer, comprising a stationary container, a centrifugal strainer basket supported therein for rotation about an upright axis, a rotatable citrus juicer head mounted within the basket, and a rotatable disk disposed beneath said juicer head and spaced a substantial distance above the bottom of the basket, operable to receive pulp from said juicer head and to hurl it outward against the inner wall of said basket.

11. A vegetable juicer comprising an upstanding container open at its top, a circular centrifugal strainer basket rotatably supported within the container, upon an upright axis, means within the container, upon an upright axis, means within the basket to pulp a vegetable, a circular filtering liner disposed within the basket, surrounding the pulping means, and means circularly disposed within the liner unrestrained against radially inward movement, and of considerable mass for pressing the filtering liner against the wall of the basket by the centrifugal force of said means, to hold the liner in operative position.

12. A vegetable juicer, comprising an upstanding container, a circular centrifugal strainer basket rotatably supported within the container, upon an upright axis, means within the basket to pulp a vegetable, a filtering liner within the periphery of the basket and surrounding the pulping means, and a spring band of considerable mass disposed about the upper part of said liner, and pressing the liner toward the wall of the basket both by its resilience and by the centrifugal force of the rotating band, to hold such upper part of the liner in place.

13. A vegetable juicer comprising an upstanding container, a circular centrifugal strainer basket rotatably supported within the container upon an upright axis, means within the basket to pulp a vegetable, a circular filtering liner within the periphery of the basket, surrounding the pulping means, contractile means carried by an edge of the liner, drawing such edge radially inward, and a flexible band disposed within said liner and spaced substantially directly radially outward from the liner edge carrying said contractile means, operable to press the liner toward the wall of the basket, and cooperating with said contractile means to form of the liner edge an inwardly directed flange.

ROY WESTON.